May 21, 1940.  R. C. DURANT  2,201,858
COUPLING DEVICE
Filed Jan. 28, 1939
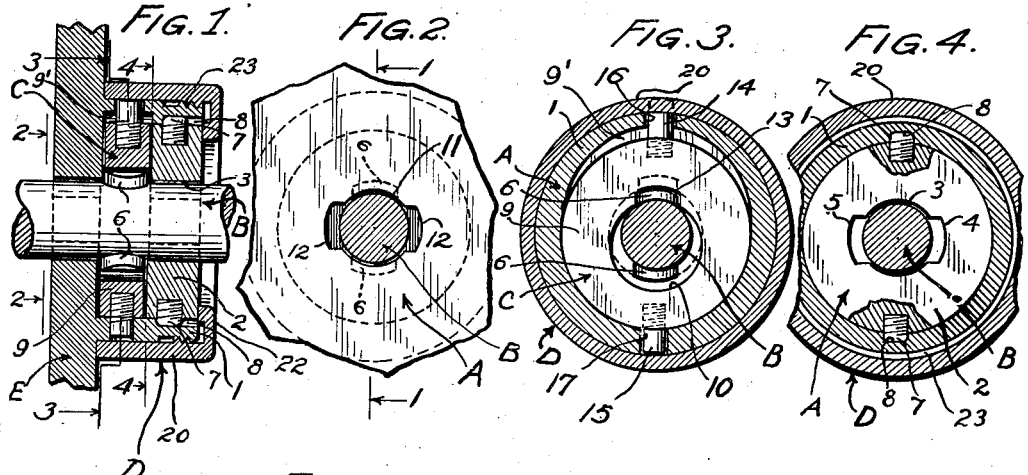
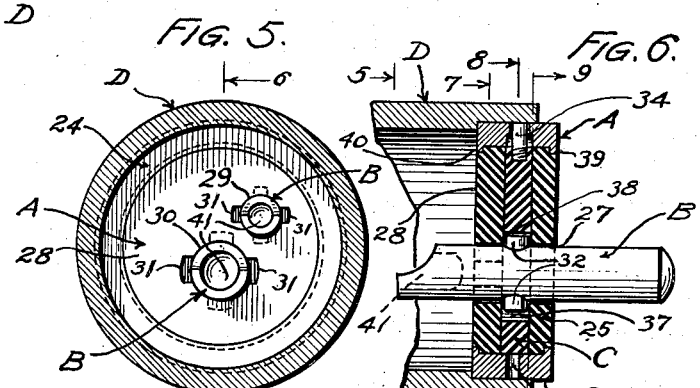
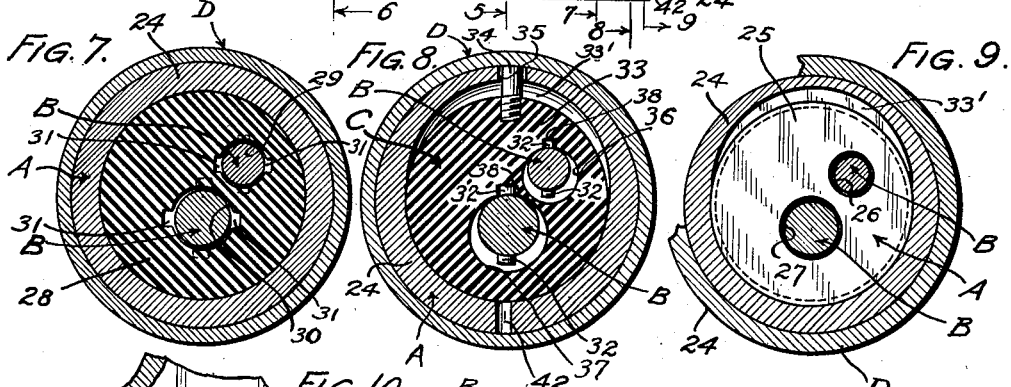
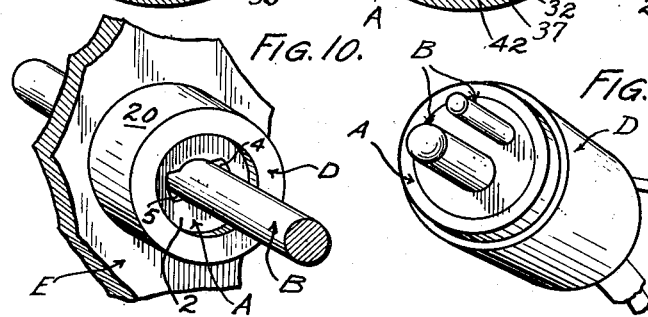
Inventor:
RAYMOND C. DURANT
by Arthur Mack
Attorney.

Patented May 21, 1940

2,201,858

UNITED STATES PATENT OFFICE 2,201,858

COUPLING DEVICE

Raymond C. Durant, Pasadena, Calif.

Application January 28, 1939, Serial No. 253,353

4 Claims. (Cl. 287—103)

This invention relates to and has for an object the provision of a novel and efficient coupling device with which is combined in an ingenious manner a positive lock for securely holding in the desired relation the parts or elements coupled thereby, the device hereof being particularly efficacious in that it may be made as a small, compact and relatively inexpensive unit or as large as desired without undue added cost and put to a great variety of uses and readily operated without special tools in various electrical and mechanical fields such as in the mounting of male and female contact members, the joining of conductors to one another, cable connectors, etc., and as a shaft coupling or mounting or a coupling between driving and driven elements or in fact between any two members wherein a quick coupling and uncoupling thereof is desirable and a positive lock up of the parts may be had.

Another object of this invention is to provide a coupling device of the character described wherein the main and novel features thereof are embodied in one unit of the two necessary to make a coupling, said one element being the female unit and including the novel locking means of the invention and being so constructed and arranged that the other element need only be provided with one or more lugs or keys and be capable of insertion and manipulation with respect thereto in order to complete the coupling, and therefore the part, element, contact member or the like which is to be coupled to an associated element to which the female unit is attached, may serve as a part of the coupling by the mere addition thereto of a lug, key or projection as aforesaid and moreover the female part or unit also readily lends itself to incorporation with or attachment to or may itself constitute the other coupled part or element.

Another purpose of the coupling device hereof is to provide for a quick locking of the coupled elements by a mere rotation of one element relative to the other, and a movement of the locking means into locking position, followed by a fitting of a shell, barrel, or ring member or the application of other means to the element containing the locking means whereby due to such presence of the shell, ring or means, the locking means will remain locked and may only be unlocked upon removal of said shell or other means.

I have shown in the accompanying drawing a preferred form of coupling device embodying my invention, subject however, to modification, within the scope of the appended claims, without departing from the spirit of my invention.

Reference is now had to the drawing:

Figure 1 is a sectional view of a coupling device embodying my invention and as taken on the line 1—1 of Figure 2;

Figure 2 is a sectional view taken on the plane of line 2—2 of Figure 1;

Figure 3 is a sectional view taken on the line 3—3 of Figure 1;

Figure 4 is a sectional view taken on the line 4—4 of Figure 1;

Figure 5 is a sectional view of a variational form of the invention taken on the line 5—5 of Figure 6;

Figure 6 is a sectional view taken on the line 6—6 of Figure 5;

Figures 7, 8, and 9 are sectional views taken respectively on lines 7—7, 8—8 and 9—9 of Figure 6;

Figure 10 is a fragmentary perspective view of the coupling device shown in Figures 1 to 4 inclusive; and Figure 11 is a perspective view of the form of the coupling device shown in Figures 5 to 9 inclusive.

As shown in detail in the accompanying drawing, the coupling device of my invention primarily includes a female coupling unit A, and a male coupling unit B which are constructed and arranged so that the male unit when inserted in place and turned on its axis can not be withdrawn unless reversely rotated to the position assumed when inserted, together with a lock C embodied in the female unit and engageable with the male unit to prevent such rotation thereof as would permit uncoupling of said units, and a suitable lock holding means, such as the member D here shown as removably engaged with said female unit to hold the lock in locking position. Uncoupling of the units is effected by removing the member D and then moving the lock to unlocked position with a suitable tool not shown.

As shown in Figures 1 to 4 inclusive and Figure 10, the female unit A is fixed to and becomes a part of a driving member E and the male unit B is in the form of a shaft to be driven through its coupling with the female unit. In this use of the coupling device, the female unit A comprises a cylindrical body or barrel 1 formed integral with or otherwise fixed to the member E and containing a circular disk 2 having an opening 3 therethrough for reception of the male unit B. Notches or recesses 4 and 5 are formed on opposite sides of the opening 3 so that opposed lugs or projections 6 on the male unit may be engaged in said notches to permit of the insertion of the male unit through the disk 2. Extending from the periphery of the disk 2 are lugs or projections 7 which engage in recesses 8 on the inner surface of the body 2 to hold the disk 2 against turning in the body 1. Upon turning the male member B on its axis after insertion through the opening 3 in the disk 2 the lugs 6 are moved out of alinement with the notches 4 and 5 and therefore withdrawal of the male member is prevented. In order to lock this male member against rotation into a position which would aline the projection 6 and notches 4 and 5 and thereby permit uncoupling of the two units, I provide the lock means C which is in the form of a disk 9 shiftably mounted in the cylindrical body 1 rearwardly of the outer disk 2 and provided with an opening 10 through which the male member may be extended. In this connection, it is noted that the member E may also be provided with an opening 11 and side notches 12 corresponding to and in alinement with those in the disk 2 and for reception of the male member B. The bore of the cylindrical body member 1 is enlarged as at 9' so that the disk 9 may be shifted bodily therein while guided by opposite sides of the bore, whereby the opening 10 may be positioned so as to be concentric or eccentric to the opening 3, and a lock notch 13 contiguous with said opening 10 may be positioned so as to be spaced from or to receive one of the lugs 6 on the male member. Guide pins 14 and 15 are projected from opposite sides of the periphery of the locking disk 9 and are slidably engaged in openings 16 and 17 formed in the body member 1. These pins hold the disk 9 against rotation while permitting it to be shifted to dispose the opening 10 and notch 13 in locking and unlocking positions as above noted. It is now seen that when the opening 10 is eccentric to the opening 3 and one of the lugs 6 is engaged in the notch 13, the male member A is prevented rotation sufficient to bring the lugs 6 into registration with the notches 4 and 5. In this connection, it should be noted that the notch 13 is disposed in the upper side of the opening 10 so that the male member must be turned through ninety degrees in order to bring one of the lugs 6 after insertion through the opening 3, into registration with the locking notch 13. However, these relations may be varied as desired. Since the member 9 is free to shift transversely in the body member 1, said member 9 does not effect the locking of the male member until shifted into eccentric position.

When the openings 10 and 3 are concentric the pin 14 projects from the outer periphery of the cylindrical member 1 and upon engaging and pushing said pin inwardly by hand or otherwise the member 9 will be moved into locking position. The lock holding member D is provided for obstructing the pin 14 so that the disk 9 is therefore maintained in locked position. In the present instance, the member D is in the form of a shell or ring 20 adapted to be threadedly engaged with the member 1 and provided with an annular and inwardly extending flange 22 which is adapted to bear against the outer face of the disk 2 whereby to hold said disks in place. The members 1 and 20 are therefore provided with cooperating screw threads 23 and whereby the member 20 may be held in place.

To uncouple the coupling device hereof the member 20 is removed and by inserting a nail or similar instrument through the opening 17 and engaging the pin 15 the member 9 may be moved so as to dispose its opening 13 concentric with the opening 3 and to disengage the notched portion 13 from the projection 6. The male member may now be turned to bring the projection 6 into registration with the notches 4 and 5 and then readily removed from the female unit.

In the form of the invention shown in Figures 1 to 4 inclusive and Figure 10, the male member may be withdrawn from either side of the female unit and likewise inserted from either side in view of the provision of the opening 11 in the member E. Although this embodiment of the invention takes into consideration the coupling of a driving and driven member, it is seen that it may be used for various other purposes, and in all events will comprise a male unit and a female unit such as here shown and described regardless of what the female unit is attached to or what type of element or part the male unit comprises. Thus the male unit may consist of any member capable of insertion into the female unit and which is provided with projections or lugs corresponding to the one 6 here shown.

It is now seen that the coupling device of this invention will provide for a quick connection of any two parts which are to be attached or joined and also for a convenient and positive locking of said parts against uncoupling, primarily through the expediency of the especially constructed female unit in which is included the lock means of this invention.

Referring to Figures 5 to 9 inclusive, also Figure 11, the coupling device hereof in a variational form is shown as employed for connecting the male contact elements of an electrical plug to a plug body. This form of coupling device essentially includes the male coupling units B, female unit A, lock means C and lock holding means D. In this application of the coupling, the female unit consists of a cylindrical ring-like body 24 having one end closed by a disk 25 provided with circular openings 26 and 27 for reception of the male elements B. The other end of the body 24 is closed by a similar disk 28 having openings 29 and 30 alined with the openings 26 and 27 and also provided on opposite sides with recesses or notches 31. The male elements are inserted from the side of the member 24 closed by the disk 28 so that lugs or projections 32 on said elements may pass through the recesses 31. The members B after being thus inserted are turned so as to bring the lugs 32 out of registration with the recesses 31 whereby to prevent longitudinal movement of the members B relative to the member A.

The locking means C comprises a shiftable and non-rotatable disk 33 corresponding to the one 9 and operating between the disks 25 and 28 in an enlargement 33' corresponding to the one 9'. This disk is provided with a guide pin 34 slidably engaged in an opening 35 in the member 24 and has openings 36 and 37 which are adapted to be moved into and out of concentric relation with the openings 29 and 30. Notches or recesses 38 are provided in the upper sides of the openings 36 and 37 so that when the members B are rotated through 90 degrees or any lesser or greater extent depending upon the relative set positions of the notches 31 and 38, the projections 32 are brought into alinement with the notches 38. It is now necessary to move the locking disk 33 so that the projections 32 engage in the notches 38 whereby the members B are prevented from turning on their axes as necessary to effect their withdrawal. This is accomplished by pushing the pin 34 inwardly or otherwise causing the lock disk 33 to move into a position in the enlargement 33' such that the notches 38 will receive the lugs 32 and thereby prevent turning of the members B. Following this setting of the lock the member D is fitted over the female member as shown in Figure 6 whereby said member D will obstruct the pin 34 and prevent movement of the lock disk 33 out of locking position. It should be noted in the present instance that the plates or disks 25 and 28 are held in place by marginal beads 39 and 40 which are formed on the edges of the ring member 24 after insertion of said disks. It should be further noted that the member D in this instance is in the form of a tubular plug body and that the members B serve as contacts and are provided with wells 41 at their inner ends whereby conductors not shown may be soldered thereto.

Figure 11 particularly illustrates a finished contact device wherein the plug members constitute the male elements B of the coupling device and the female element A constitutes a part of the plug body. To remove the members B it is necessary to separate the female unit A from the part D so as to free the pin 34 following which, through an opening 42 in the member 24 a nail, pin or the like may be inserted so as to engage and push the locking disk 33 into position freeing the lugs 32 from the notches 38. The members B may then be rotated to bring the members 32 into alinement with the side notches 31 whereby they may be withdrawn from the openings 29 and 30. It is now seen that the coupling hereof is particularly well adapted for electrical uses such as hereinbefore described and as shown in Figures 5 to 9 inclusive also Figure 11. Aside from the use here shown it may be employed for connecting conductors, cables and other electrical units which must be detachably coupled. One important provision of the coupling device hereof in so far as related to electrical contact devices is that the desired tolerance or play of the contact element may be provided by a loose fitting thereof, while at the same time holding said element locked in predetermined position and relation.

What I claim as new is:

1. A coupling device including a female unit, a male unit for insertion into and removal from said female unit, a locking member shiftably mounted interiorly of said female unit for preventing withdrawal of said male unit, and a lock holding member which when mounted on said female unit will maintain the locking member in locking position, said female unit including a barrel-like body, a member fixed interiorly thereof and having an opening through which said male unit is insertable, and provided with a notch at an edge of said opening, said male unit including a lug fixed thereon and movable through said notch, said lug preventing withdrawal of the male member when the latter is turned to move the lug out of alinement with said notch, said locking member having an opening for reception of said male unit and a notch for reception of said lug, and means holding said locking member against rotation in said body with the notch in the locking member out of alinement with the notch in said fixed member, while permitting a shifting of the locking member to bring the notch therein into and out of position to receive and hold the lug on said male unit, said body having openings affording access to said locking member whereby the latter may be moved into and out of locking position, said means for holding said locking member against rotation including a projection on said locking member slidably engaged in one of said openings in said body, and a lock holding member removably mounted on said body so as to cover the openings of said body and obstruct such movement of said projection as would permit the locking member to be moved out of locking position.

2. A coupling device including a hollow body, a member fixed to said body and having an opening therein and a notch at an edge of the opening, a male member adapted to be inserted through said opening and having a lug thereon which may pass through said notch and will engage the inner face of said fixed member and prevent withdrawal of said male member when the latter is turned on its axis sufficiently to move the lug to one side of said notch, locking means mounted interiorly of said body for engaging and holding said lug to prevent rotation of the male member into position for alining the lug with said notch, and means affording the locking and unlocking of said locking means from the exterior of said body.

3. A coupling device including a hollow body, a member fixed to said body and having an opening therein and a notch at an edge of the opening, a male member adapted to be inserted through said opening and having a lug thereon which may pass through said notch and will engage the inner face of said fixed member and prevent withdrawal of said male member when the latter is turned on its axis sufficiently to move the lug to one side of said notch, locking means mounted interiorly of said body for engaging and holding said lug to prevent rotation of the male member into position for alining the lug with said notch, and means affording the locking and unlocking of said locking means from the exterior of said body, said locking means including a disk shiftably and non-rotatably maintained in said body and having an opening for reception of said male member and a notch for reception of said lug, and a pin fixed on said disk and slidably engaged with said body whereby said disk may be shifted transversely of said body into and out of a position wherein the lug is engaged in the notch of said disk.

4. A coupling device comprising a female member having an opening through which a male member may be inserted, said fixed member having a notch at an edge of said opening, a male member insertable through said opening and adapted to be turned therein, a lug fixed on said male member and adapted to pass through said notch and to prevent withdrawal of the male member when said male member is rotated sufficient to move the lug to one side of said notch, a locking member and means for non-rotatively securing said locking member in operative relation to said female member and for shifting movement relative thereto, said locking member having an opening which when said locking member is shifted will be moved into and out of concentric relation to the opening in said female member while said male member is extended through both of said openings, said locking member having a notch which when said openings are eccentrically related will receive said lug and hold the male member against rotation and when said openings are concentric will release said lug.

RAYMOND C. DURANT.